(12) United States Patent
Himmelsbach et al.

(10) Patent No.: US 9,528,572 B2
(45) Date of Patent: Dec. 27, 2016

(54) GEAR UNIT FOR A COMPOUND TRANSMISSION

(71) Applicants: Raphael Himmelsbach, Friedrichshafen (DE); Michael Wechs, Lindau (DE); Karl Grad, Ruderting (DE); Stefan Beck, Eriskirch (DE); Martin Rattay, Ravensburg (DE)

(72) Inventors: Raphael Himmelsbach, Friedrichshafen (DE); Michael Wechs, Lindau (DE); Karl Grad, Ruderting (DE); Stefan Beck, Eriskirch (DE); Martin Rattay, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 41 days.

(21) Appl. No.: 14/608,989

(22) Filed: Jan. 29, 2015

(65) Prior Publication Data
US 2015/0211608 A1 Jul. 30, 2015

(30) Foreign Application Priority Data
Jan. 30, 2014 (DE) .................. 10 2014 201 646

(51) Int. Cl.
*F16H 3/62* (2006.01)
*F16H 3/46* (2006.01)
(Continued)

(52) U.S. Cl.
CPC .............. *F16H 3/46* (2013.01); *F16H 3/663* (2013.01); *F16H 37/042* (2013.01);
(Continued)

(58) Field of Classification Search
CPC ........................................ F16H 3/663
(Continued)

(56) References Cited

U.S. PATENT DOCUMENTS 1,430,799 A * 10/1922 Davis .................. F16H 3/663
475/296
1,633,052 A * 6/1927 Watts .................. F16H 3/663
475/290
(Continued)

FOREIGN PATENT DOCUMENTS

DE     31 37 857     4/1983

OTHER PUBLICATIONS

Florian Mulzer: Systematik hoch übersetzender koaxialer Getriebe. Dissertation, Letzte Änderung May 26, 2010, Seiten: Deekblatt, 32, 35, 36, 144-148. Mediatum TU München [online]. In: https://mediatum.ub.tum.de/doc/736691/736691.pdf.

*Primary Examiner* — Sherry Estremsky
(74) *Attorney, Agent, or Firm* — Cozen O'Connor

(57) ABSTRACT

A gear unit for a compound transmission has a planetary stage that couples an input and an output shaft for different transmission ratios. The planetary stage includes a sun gear, a ring gear and planet gears rotatably supported at a planet carrier. The planet gears have a region with two different toothings arranged axially offset with respect to an axis of rotation of the planetary stage. A meshing engagement with a first sun gear and/or a first ring gear is produced via the first toothing. The planet gears mesh at the second toothing with a second sun gear and/or a second ring gear, and one component of the planetary stage is connected to the input shaft to be fixed with respect to rotation and one component is fixed at a housing, while the rest of the components can be coupled with the output shaft, respectively.

16 Claims, 3 Drawing Sheets

(51) Int. Cl.
*F16H 3/66* (2006.01)
*F16H 37/04* (2006.01)
*F16H 3/44* (2006.01)

(52) U.S. Cl.
CPC ............... *F16H 2003/447* (2013.01); *F16H 2200/0034* (2013.01); *F16H 2200/0039* (2013.01); *F16H 2200/2007* (2013.01); *F16H 2200/2038* (2013.01); *F16H 2200/2041* (2013.01); *F16H 2200/2097* (2013.01)

(58) Field of Classification Search
USPC ........................................................ 475/338
See application file for complete search history.

(56) References Cited

U.S. PATENT DOCUMENTS

| | | | | |
|---|---|---|---|---|
| 2,471,669 A | * | 5/1949 | Baker | F16H 3/663 475/116 |
| 2,552,000 A | * | 5/1951 | Du Bois | F16H 3/663 123/561 |
| 2,690,086 A | * | 9/1954 | Cook | F16H 37/042 475/219 |
| 3,721,135 A | * | 3/1973 | Kelly | B23F 1/04 475/282 |
| 4,738,162 A | * | 4/1988 | Slotosch | F16H 3/663 475/296 |
| 4,802,384 A | * | 2/1989 | Schwarz | F16H 3/091 74/335 |
| 6,723,018 B2 | * | 4/2004 | Hayabuchi | F16H 3/663 475/276 |
| 6,893,373 B2 | * | 5/2005 | Kawamoto | F16H 3/666 475/302 |
| 8,425,368 B2 | * | 4/2013 | Phillips | F16H 3/663 475/275 |
| 2006/0172850 A1 | * | 8/2006 | Sung | F16H 3/663 475/269 |
| 2008/0245167 A1 | | 10/2008 | Gitt | |
| 2013/0005526 A1 | * | 1/2013 | Matsubara | B60K 1/00 475/290 |

* cited by examiner

GEAR UNIT FOR A COMPOUND TRANSMISSION

BACKGROUND OF THE INVENTION

1. Field of the Invention

The invention is directed to a gear unit for a compound transmission having a planetary stage by which an input shaft and an output shaft can be coupled with one another to realize different transmission ratios, wherein the planetary stage comprises at least one sun gear, at least one ring gear, and at least one planet carrier guiding a planet gear.

2. Description of the Related Art

Compound transmissions are used inter alia for agricultural and municipal utility vehicles to achieve large speed ranges at a reasonable cost. Thus the very broad spectrum of duties of an agricultural or municipal utility vehicle, e.g., the performance of work in fields and transportation, results in a wide variety of driving ranges which requires a correspondingly large spread between a slowest speed and a fastest speed. Further, transmissions in utility vehicles of this type usually require small geometric ratio steps between the individual speeds and this, combined with the large spread, results in the large number of speeds.

A compound transmission in an agricultural or municipal utility vehicle typically comprises a stepped group or main group, an upstream or downstream splitter group, a range group which is usually arranged downstream, and often also a reversing group and a creeper gear group. A gear sequence of the transmission is predefined by the main group, this gear sequence being correspondingly influenced by the further upstream and downstream transmission groups and the respective stages thereof. Thus the gear sequence of the main group is compressed by an upstream or downstream splitter group in that the gear ratio steps of the main group are divided by small ratio steps of the splitter group and the number of ratios is subsequently multiplied by the number of realizable steps of the splitter group. In contrast, a downstream range group causes a multiplication of the gear steps of the main group in different driving ranges by large ratio steps. By a reversing group which is also usually provided, a reversal of rotational direction can be realized which, in conjunction with the other transmission groups, usually also makes it possible to realize a plurality of reverse speeds. Finally, a creeper gear group is provided for the purpose of realizing a slow driving of the respective utility vehicle by an extensive reduction, for example for using in difficult terrain or for work requiring an extremely slow driving of the utility vehicle.

US2008/0245167 A1 discloses a transmission unit for a compound transmission comprising a planetary stage and forms within the compound transmission a range group downstream of the main group of the compound transmission. An input shaft of the range group and an output shaft can be coupled with one another via the planetary stage to realize different transmission ratios, this planetary stage comprising the following components: sun gear, ring gear, and a planet carrier guiding a plurality of planet gears. Of these components, the sun gear is then arranged on the input shaft and the planet carrier is coupled with the output shaft so as to be fixed with respect to rotation relative to it, while the ring gear can be fixed at a housing on the one hand and likewise coupled with the output shaft so as to be fixed with respect to rotation relative to it on the other hand for realizing the different transmission ratios.

SUMMARY OF THE INVENTION

It is an object of the present invention to provide a transmission unit for a compound transmission in which different transmission ratios can be realized in the most compact manner possible.

According to one embodiment of the invention, a gear unit for a compound transmission comprises a planetary stage by which an input shaft and an output shaft can be coupled with one another to realize different transmission ratios. The components comprised by the planetary stage include at least one sun gear, at least one ring gear, and planet gears which are rotatably mounted at a planet carrier.

The gear unit according to one embodiment of the invention can form a splitter group, a range group or a reversing group of a compound transmission depending on the definition of the different transmission ratios and is arranged upstream or downstream of a main group depending on the arrangement within a compound transmission. In a particularly preferred manner, however, transmission ratios of the gear unit are defined such that the gear unit combines a typical reversing group and a range group or splitter group in a module in a compact manner. Accordingly, in this case, a reversal of rotational direction is carried out at least when shifting one of the transmission ratios, while at least one remaining transmission ratio forms a multiplication suitable for a splitter group or a range group.

According to one embodiment of the invention, the input shaft and the output shaft preferably extend coaxially with respect to one another. Alternately, however, an axially parallel or angular arrangement of the two shafts is also conceivable. In particular, in the latter case the input shaft and the output shaft extend substantially orthogonal to one another such that a construction of the gear unit suitable for a front-transverse design is realized.

The planetary stage is further characterized in that it comprises planet gears which are rotatably mounted at the planet carrier, and these planet gears have a region with at least two different toothings which are arranged so as to be axially offset with respect to an axis of rotation of the planetary stage. Alternatively, instead of an integral construction such as is described above, an arrangement in which the planet gears are constructed in the form of at least two different planet gears which are arranged so as to be axially offset and which have different toothings is also conceivable.

The planetary stage comprises two sun gears which are axially offset, wherein the first sun gear and the second sun gear have a different toothing in each instance. A meshing engagement with the first sun gear and/or a first ring gear is produced via the first toothing of the planet gears. The planet gears mesh at the second toothing with the second sun gear and/or a second ring gear.

The wording "and/or" with regard to the meshing engagement of the planet gears with the sun gears or ring gears is intended to express that different arrangements of the planetary stage are conceivable. Each of the sun gears preferably meshes with a toothing of the planet gears, while only one toothing of the planet gears meshes with a ring gear. Further, the planetary stage can have a sun gear and a first ring gear and second ring gear. Beyond this, according to one embodiment of the invention, arrangements of the planetary stage in which two different sun gears mesh with the respective toothings of the planet gears and each of the toothings of the planet gears meshes with the toothing of a corresponding ring gear are also conceivable. In this case it is necessary that the load paths for the further coupling of the ring gears can be selectively interrupted. This means that the load path for coupling the first ring gear is selectively opened, while the load path for coupling the second ring gear is closed. Analogously, there is a further possible opposite condition in which the load path for coupling the first ring gear is closed and the load path for coupling the second ring gear is opened. This ensures that the planetary stage is not blocked because of stressing due to oppositely acting load paths. This would result in the event of simultaneously closed load paths. Consequently, the quantity of transmission ratios that can be realized is increased by 1. This is counteracted by a condition in which both load paths are opened so that a load interruption occurs. The selective interruptibility can be realized for example by positively engaging or frictionally engaging shifting elements.

Further, one component of the planetary stage is connected to the input shaft and one component is fixed at a housing, while the rest of the components can be coupled with the output shaft, respectively.

One component of the planetary stage is connected to the input shaft so as to be fixed with respect to rotation relative to it, while another component is stationary at a housing and is therefore permanently prevented from moving in rotation. The rest of the components of the planetary stage can then be coupled individually with the output shaft of the gear unit so as to be fixed with respect to rotation relative to it.

This type of arrangement of a gear unit has the advantage that a plurality of different transmission ratios can be realized in a compact manner and, further, when the individual components of the planetary stage are connected in a corresponding manner and with a corresponding selection of stationary ratios, different rotational directions of the output shaft can be realized without difficulty such that the gear unit according to one embodiment of the invention can combine a conventional reversing group with a splitter group or range group. Because the at least one planet gear is constructed as a stepped planet, a plurality of meshing engagements with further components of the planetary stage can be produced within a compact installation space. Due to the further fact that one of the components is connected to the input shaft and one component is fixed at a housing, while the rest of the components can be coupled with the output shaft particularly so as to be fixed with respect to rotation relative to it, it is possible to define a plurality of different transmission ratios in this compact installation space. Further, by using a planetary stage, very small ratio steps can advantageously be realized between two gear ratios, for example, forward gear ratios. Ideally, the ratio steps are distributed irregularly across the overall transmission spread such that the finest possible gearing gradation is provided in a main work range (very high to maximum traction requirement). In this way, an availability of traction close to the ideal operating point of the powertrain is achieved in the main work range. Outside of the main work range, for example, for transportation at the highest possible speed, a fine gradation of this kind is not absolutely necessary.

In contrast, the planet gears in the gear unit in US 2008/0245167 A1 are outfitted in each instance with only one toothing by which they meshingly engage with the radially inner sun gear and with the radially circumscribing ring gear. Different transmission ratios could, of course, also be defined between the input shaft and output shaft, but the quantity of these transmission ratios is limited to two transmission ratios, one of which realizes a rigid driving through blockage of the planetary stage.

According to one embodiment of the invention, the planetary stage is preferably realized as a minus planetary stage, i.e., the planet carrier carries at least one planet gear which meshes at its first toothing and at its second toothing respectively with the radially adjacent component, i.e., where applicable, meshingly engages with the first sun gear and second sun gear and with the first ring gear and the second ring gear, respectively. Alternatively, however, the planetary stage can also be configured as a plus planetary stage in which the planet carrier carries at least one pair of planet gears, wherein the two planet gears are then preferably constructed with two toothings in each instance, i.e., are stepped planets in each instance. One planet gear of a planet gear pair then meshes with the sun gear or sun gears, while the other respective planet gear meshingly engages with the ring gear or ring gears. In addition, the planet gears of a planet gear pair mesh with one another.

In the gear unit according to one embodiment of the invention, a first stationary ratio defined by the interaction between the first toothing of the planet gears and the first sun gear and/or the first ring gear is smaller than or greater than a second stationary ratio defined by the interaction between the second toothing of the planet gears and the second sun gear and/or the second ring gear. In this way, ratio steps can be defined between the individually realizable transmission ratios and, further, it is possible to exert an influence on whether the same rotational directions or opposite rotational directions are adjusted at the input shaft and output shaft when shifting the individual transmission ratios. Corresponding to an embodiment form of the invention, the input shaft and the output shaft can further be connected to one another so as to be fixed with respect to rotation relative to one another. Accordingly, the input shaft and the output shaft can be coupled with one another directly so as to be fixed with respect to rotation relative to one another such that a direct drive is realized.

With respect to the various possibilities for connecting the components of the planetary stage, the planet carrier in a first possible embodiment of the invention is fixed at the housing and the first sun gear is connected to the input shaft so as to be fixed with respect to rotation relative to it, while the rest of the components can be respectively coupled with the output shaft. In an advantageous manner, depending on further components of the planetary stage, one or more reverse speeds can also be defined, wherein in case of a larger first stationary ratio, a reversal of rotational direction of the output shaft with a ratio in the range of −1 can also be realized. Depending on the adaptation of the stationary ratios with respect to one another, a forward speed can additionally be defined with overdrive or underdrive on the output shaft.

In a second possible embodiment of the planetary stage as an alternative to the configuration mentioned above, the first sun gear is fixed at the housing and the planet carrier is coupled with the input shaft so as to be fixed with respect to rotation relative to it, whereas the rest of the components can be connected to the output shaft respectively so as to be fixed with respect to rotation relative to it. Depending on how the stationary ratios of the planetary stage are adapted to one another, one or more overdriving forward speeds and a reverse speed or a plurality of forward speeds can be defined, one or more of which overdrives or underdrives on the output shaft.

According to a further alternative possible embodiment of the invention, the second sun gear is fixed at the housing and the planet carrier is connected to the input shaft so as to be fixed with respect to rotation relative to it, while the rest of the components can be coupled respectively with the output shaft. In this case also, depending on the way in which the stationary ratios of the planetary stage are adapted to one another, different transmission ratios can again be defined which include a plurality of forward speeds with underdrive or overdrive and possibly also a reverse speed.

As a further alternative, the first ring gear is fixed at the housing and the planet carrier is connected to the input shaft so as to be fixed with respect to rotation relative to it, while the rest of the components can be connected to the output shaft respectively so as to be fixed with respect to rotation relative to it. Within the framework of a further alternative embodiment form, the second ring gear is fixed at the housing and the planet carrier is coupled with the output shaft so as to be fixed with respect to rotation relative to it, whereas the rest of the components can be connected in each instance to the output shaft so as to be fixed with respect to rotation relative to it. In both cases, different forward speeds can be formed with overdrive of a respective rotational movement on the output shaft and either a reverse speed or a forward speed with underdrive when the stationary ratios of the planetary stage are adapted to one another in a corresponding manner.

In one embodiment of the invention, a coupling of the rest of the components of the planetary stage and/or a rotationally rigid connection of the input shaft and output shaft can be produced in each instance via load shifting elements. These load shifting elements are preferably frictionally engaging shifting elements in the form of disk clutches, but other constructions are also conceivable. Further, shifting elements can also be realized in principle as positively engaging shifting elements such as jaw clutches or synchromeshes, in which case of course a change between the transmission ratios cannot be carried out under load.

The invention is not limited to the indicated combination of features of the main claim or of the claims depending thereon. Further, it is possible to combine individual features also insofar as they proceed from the claims, the following description of preferred embodiment forms or directly from the drawings. The scope of protection shall not be limited by reference to the claims in the drawings through the use of reference numerals.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Advantageous embodiments of the invention which are described in the following are shown in the drawings. The drawings show.

DETAILED DESCRIPTION OF THE PRESENTLY PREFERRED EMBODIMENTS

Figure 1:
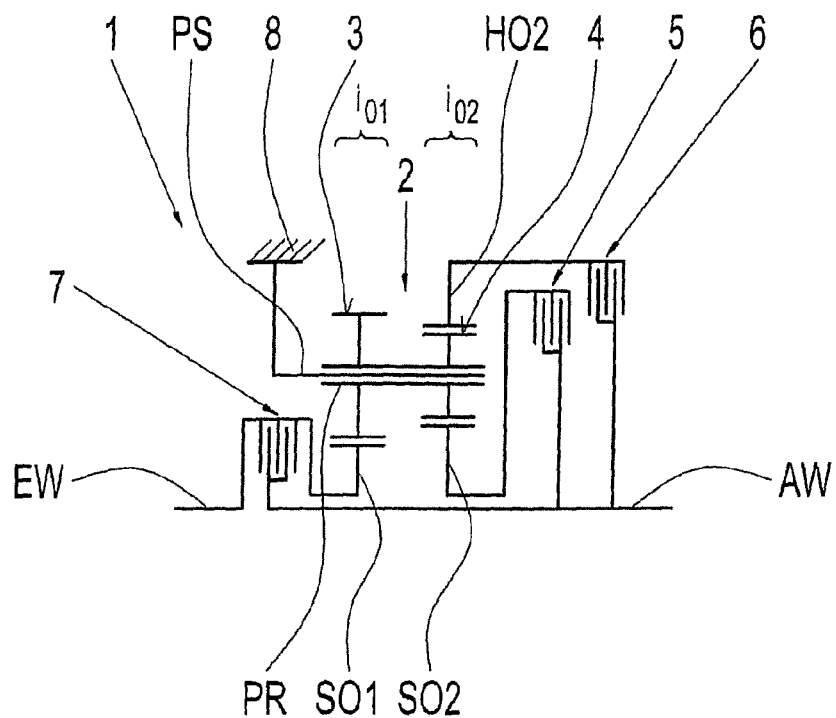
FIG. 1 is a schematic view of a gear unit.

FIG. 1 shows a schematic view of a gear unit 1 corresponding to a first embodiment of the invention, this gear unit 1 in the installed condition preferably forms part of a compound transmission of an agricultural or municipal utility vehicle, for example a tractor.

As will be seen from FIG. 1, the gear unit 1 comprises a planetary stage 2 which has a first sun gear SO1, a second sun gear SO2, a ring gear HO2, and a planet carrier PS. The planet carrier PS guides a plurality of planet gears PR, only one of which is presently shown. In each instance, the planet gears PR are rotatably mounted on the planet carrier PS and have in each instance two toothings 3 and 4 which are arranged axially adjacent to one another. Each of the planet gears PR meshes at its first toothing 3 with the radially inner first sun gear SO1, whereas meshing engagements with the radially inner, second sun gear SO2 and the radially circumscribing ring gear HO2 are produced via the second toothing 4. To this extent, the planet gears PR are constructed as stepped planets, wherein a meshing engagement with the first sun gear SO1 is axially adjacent to the meshing engagements with the second sun gear SO2 and ring gear HO2 which take place in a plane.

An input shaft EW and an output shaft AW can be coupled with one another to realize different transmission ratios by the planetary stage 2. The input shaft EW is connected to the first sun gear SO1 so as to be fixed with respect to rotation relative to it, while the output shaft AW extending coaxial to the input shaft EW can be coupled with the second sun gear SO2 via a first load shifting element 5 on the one hand and with the ring gear HO2 via a second load shifting element 6 on the other hand. Further, the output shaft AW can also be directly connected to the input shaft EW so as to be fixed with respect to rotation relative to it by actuation of an interposed third load shifting element 7 to realize a rigid drive from the input shaft EW to the output shaft AW. Finally, the planet carrier PS is permanently fixed at a surrounding housing 8 such that the rotational movement of the planet carrier PS is prevented and the planetary stage 2 consequently functions as a stationary transmission.

Depending on how the stationary ratios $i_{o1}$ and $i_{o2}$ are defined via toothing 3 in interaction with the first sun gear SO1 and via toothing 4 in interaction with the second sun gear SO2 and the ring gear HO2, different transmission ratios are formed by respective actuation of load shifting elements 5 and 6: if stationary ratio $i_{o1}$ is greater than stationary ratio $i_{o2}$, a reverse speed is defined when load shifting element 6 is actuated and the ring gear HO2 is therefore coupled with the output shaft AW so as to be fixed with respect to rotation relative to it, whereas in the case where load shifting element 5 is actuated, a rotational movement of the input shaft EW is overdriven on the output shaft AW. Thus in combination with the direct drive, two forward speeds and a reverse speed are formed, where the input shaft EW and the output shaft AW rotate opposite to one another in the latter case.

Conversely, if stationary ratio $i_{o1}$ is smaller than stationary ratio $i_{o2}$, a rotational movement is underdriven on output shaft AW when load shifting element 5 is actuated, while an actuation of load shifting element 6 results once more in a reversal of rotational direction of the output shaft AW and a reverse speed is therefore defined as a result. Accordingly, two forward speeds and a reverse speed are formed again in combination with the ability of direct coupling through via load shifting element 7.

As is shown in FIG. 1, the load shifting elements 5 to 7 are disk clutches which can be shifted under load in each instance so that a change between the individual transmission ratios and thus also between forward drive and reverse drive can be realized without interrupting the power flow.

The gear unit 1, which is shown schematically in FIG. 1, can combine a reversing group and a splitter group or range group for both possible stationary ratios $i_{01}$ and $i_{02}$, the latter being decided by the specific configuration of the transmission ratios of the forward speeds. Within a compound transmission, the gear unit 1 can then be arranged upstream or downstream of a main group.

Figure 2:
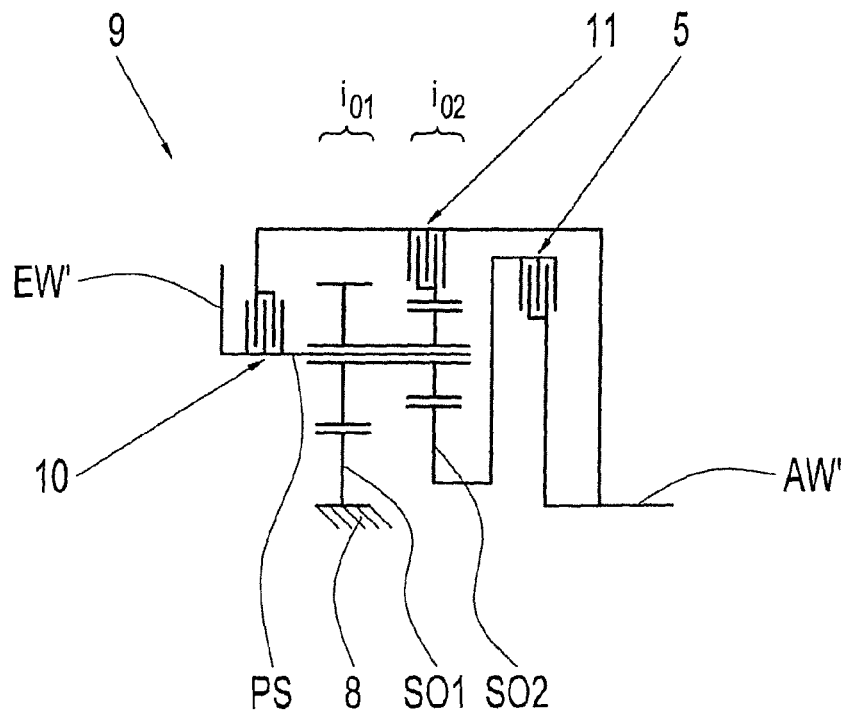
FIG. 2 is a schematic view of a gear unit.

FIG. 2 schematically shows a gear unit 9 corresponding to a second possible embodiment of the invention. In this case, in contrast to the variant shown in FIG. 1, the first sun gear SO1 is permanently fixed at the enclosing housing 8, while the planet carrier PS communicates with an input shaft EW' which extends orthogonal to an output shaft AW'. Once again, a direct rotationally rigid coupling of the input shaft EW' with the output shaft AW' can be carried out via a load shifting element 10. Finally, the ring gear HO2 can again be connected to the output shaft AW' so as to be fixed with respect to rotation relative to it via a load shifting element 11, while the second sun gear SO2 can be coupled with the output shaft AW' via load shifting element 5 in conformity with the variant according to FIG. 1.

Depending on how the stationary ratios $i_{01}$ and $i_{02}$ are adapted to one another, different transmission ratios can also be defined in case of the arrangement according to FIG. 2. If stationary ratio $i_{01}$ is selected to be greater than stationary ratio $i_{02}$, a reverse speed is shifted when load shifting element 5 is actuated, and in case load shifting element 11 is actuated a forward speed is shifted with overdriving of a rotational movement on output shaft AW'. Accordingly, together with the direct rotationally rigid coupling of input shaft EW' and output shaft AW' by load shifting element 10, two forward speeds and a reverse speed can be defined and a reversing group and a splitter group or range group can be combined in gear unit 9 when the speeds are suitably adapted.

However, if stationary ratio $i_{02}$ is selected to be greater than stationary ratio $i_{01}$, actuation of load shifting element 5 as well as load shifting element 11 leads to the configuration of a forward speed in each instance, where a rotational movement is underdriven on output shaft AW' in case the second sun gear SO2 is coupled with output shaft AW', while overdriving results again in case load shifting element 11 is actuated. Consequently, gear unit 9 can be provided as a splitter group or range group in a compound transmission in this case.

Figure 3:
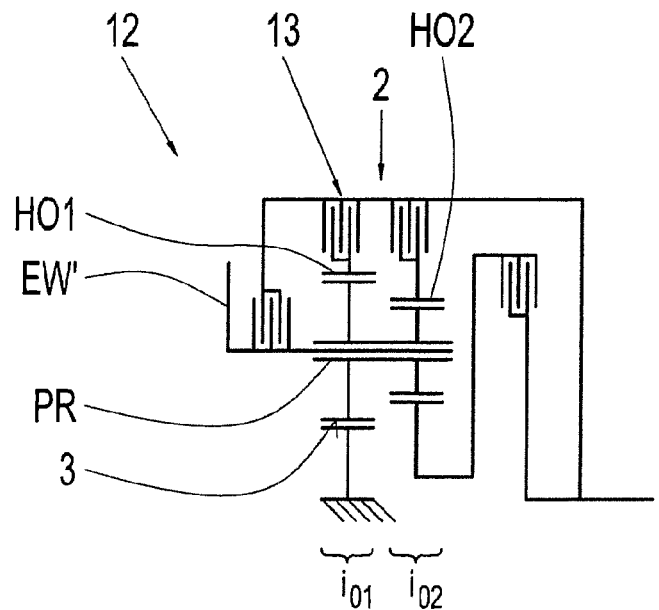
FIG. 3 is a schematic view of a gear unit.

Further, FIG. 3 shows a schematic view of a gear unit 12 corresponding to a third embodiment of the invention, this construction according to FIG. 3 substantially corresponds to the variant according to FIG. 2. One of the only difference is that in addition to ring gear HO2 there is also provided a first ring gear HO1, which meshingly engages with planet gears PR by toothing 3 and further can be coupled with the output shaft AW' by a load shifting element 13. Consequently, an additional realizable transmission ratio is provided by this additional component of the planetary stage 2, and this additional transmission ratio defines a forward speed with overdriving of a rotational movement on output shaft AW' for both possible stationary ratios $i_{01}$ and $i_{02}$ relative to one another.

Figure 4:
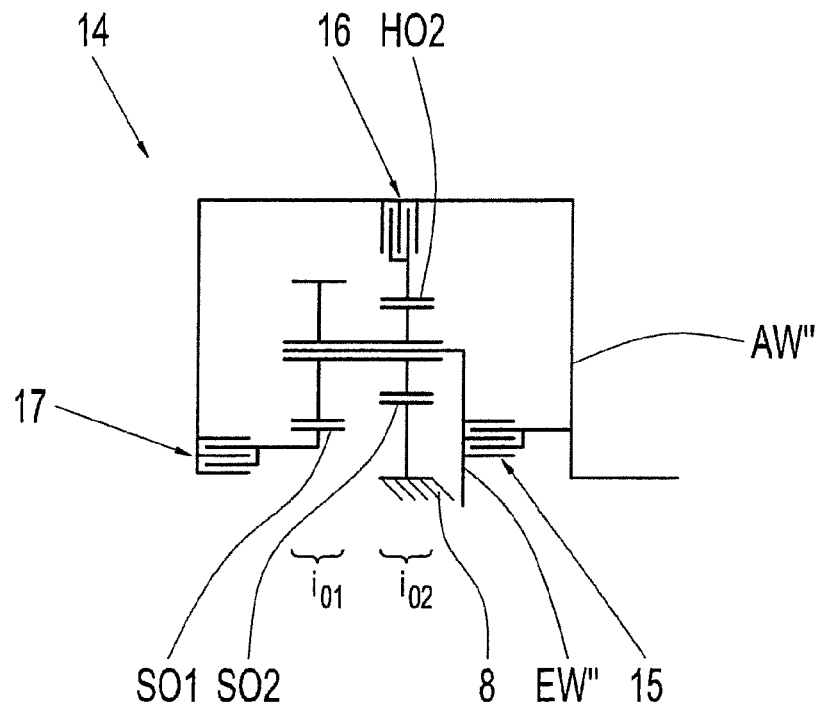
FIG. 4 is a schematic view of a gear unit.

FIG. 4 shows a schematic view of a gear unit 14 according to a fourth possible embodiment of the invention. In this case, in contrast to the variants according to FIGS. 1 to 3, the second sun gear SO2 is permanently coupled with the enclosing housing 8, whereas, as in the embodiment forms according to FIGS. 2 and 3, the planet carrier PS communicates with an input shaft EW" extending orthogonal to an output shaft AW", although in this case the input shaft EW" is moved toward the planet carrier PS situated on the side of the output shaft AW". Further, the input shaft EW" and the output shaft AW" can once again be directly connected to one another via a load shifting element 15. Finally, ring gear HO2 can be coupled with output shaft AW" so as to be fixed with respect to rotation relative to it via a load shifting element 16, while the first sun gear SO1 can be connected to the output shaft AW" via a load shifting element 17.

If stationary ratio $i_{01}$ is selected to be greater than stationary ratio $i_{02}$, a forward speed is shifted when actuating load shifting element 16 as well as when actuating load shifting element 17 and in case the first sun gear SO1 is coupled with the output shaft AW" a rotational movement is underdriven on the output shaft AW", while in case of actuation of load shifting element 16 there is overdriving. Consequently, the gear unit 14 can be provided in this case in a compound transmission as splitter group or range group.

On the other hand, if stationary ratio $i_{02}$ is selected to be greater than stationary ratio $i_{01}$, a reverse speed is shifted when load shifting element 17 is actuated and in case load shifting element 16 is actuated a forward speed is shifted with overdrive of a rotational movement on output shaft AW". Accordingly, together with the directly realizable drive of input shaft EW" to output shaft AW" a total of two forward speeds and a reverse speed can be defined. Correspondingly, the gear unit 14 can combine a reversing group and a splitter group or range group when these speeds are suitably adapted.

Figure 5:
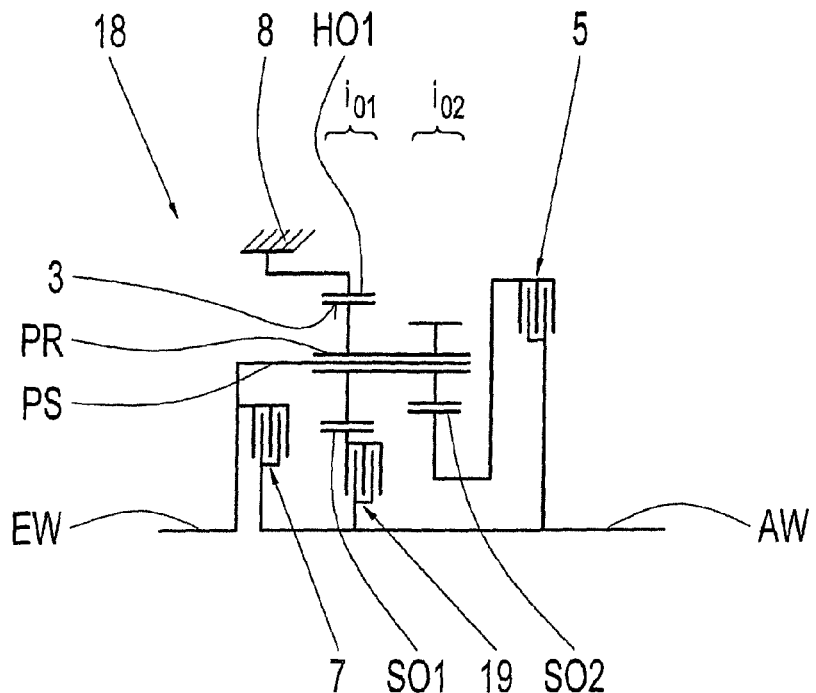
FIG. 5 is a schematic view of a gear unit.

Further, a fifth possible embodiment of a gear unit 18 is shown schematically in FIG. 5. In this case, in contrast to the variants according to FIGS. 1 to 4 which were described previously, a ring gear HO1 meshingly engaging via toothing 3 with planet gears PR is fixed at the housing 8, while the planet carrier PS guiding the planet gears PR is connected to the input shaft EW so as to be fixed with respect to rotation relative to it. Further, both sun gear SO1 and sun gear SO2 can be coupled with the output shaft AW via associated load shifting elements 5 and 19. In addition, input shaft EW and output shaft AW can be directly connected to one another again via load shifting element 7.

Depending on an adaptation of stationary ratios $i_{01}$ and $i_{02}$ to one another, different transmission ratios can again be defined also in the case of the variant in FIG. 5. Accordingly, for both ratios $i_{01}$ and $i_{02}$ relative to one another when actuating load shifting elements 5 and 19 forward speeds are defined in which a respective rotational movement of the input shaft EW is overdriven on the output shaft AW. However, the sequence of these forward speeds changes when changing the ratio of stationary ratios $i_{01}$ and $i_{02}$ relative to one another.

Since a total of three forward speeds can accordingly be realized in combination with the ability to directly couple via the load shifting element 7, the gear unit 18 in FIG. 5 is suitable for using in a compound transmission either as a splitter group or as a range group depending on the specific transmission ratios of the speeds.

Figure 6:
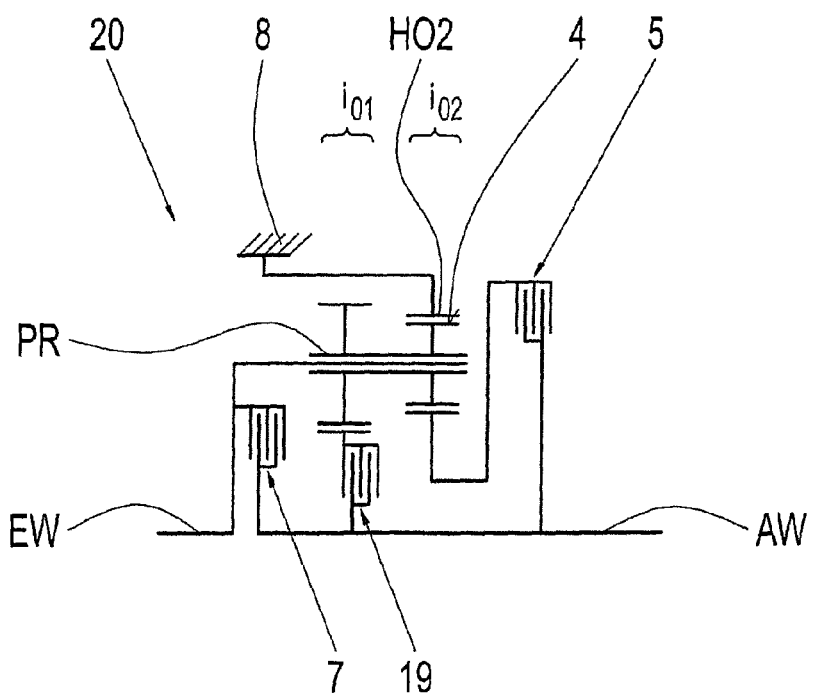
FIG. 6 is a schematic view of a gear unit.

Finally, FIG. 6 shows a sixth possible embodiment of the invention in the form of a gear unit 20. This corresponds substantially to the variant in FIG. 5 but in this case, instead of ring gear HO1, a ring gear HO2 is provided which meshingly engages with the planet gears PR by toothing 4 thereof and is permanently fixed at the housing 8. Otherwise, the arrangement according to FIG. 6 corresponds to the variant according to FIG. 5, where conditions are inverted with respect to the realizable speeds in the different ratios of stationary ratio $i_{01}$ to stationary ratio $i_{02}$.

Different transmission ratios can be realized between an input shaft and an output shaft in a compact manner by means of the individual arrangements of a gear unit according to one embodiment of the invention.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A gear unit (1, 9, 12, 14, 18, 20) for a compound transmission comprising:
    a housing;
        a planetary stage (2) configured to couple an input shaft (EW, EW', EW") and an output shaft (AW, AW', AW") with one another with different transmission ratios, wherein the planetary stage (2) comprises:
        a planet carrier
            at least one sun gear (SO1, SO2);
            at least one ring gear; and
            planet gears (PR) rotatably supported at the planet carrier (PS), the planet gears (PR) having a region with at least a first toothing and a second toothing (3, 4) that are axially offset with respect to an axis of rotation of the planetary stage,
        wherein a meshing engagement with at least one of a first sun gear (SO1) and a first ring gear is produced via the first toothing (3),
        wherein the planet gears (PR) mesh at the second toothing (4) with at least one of a second sun gear (SO2) and a second ring gear (HO2), and
    wherein one component of the planetary stage (2) is connected to the input shaft (EW, EW', EW") so as to be fixed with respect to rotation relative, one component of the planetary stage is fixed at the housing (8), and the rest of the components are configured to be coupled with the output shaft (AW, AW', AW"), respectively,
    wherein the input shaft (EW, EW', EW") and the output shaft (AW, AW', AW") are configured to be connected to one another so as to be fixed with respect to rotation relative to one another.

2. The gear unit (1, 9, 12, 14, 18, 20) according to claim 1, wherein a first stationary ratio ($i_{o1}$) defined by an interaction between the first toothing (3) of the planet gears (PR) and at least one of the first sun gear (SO1) and a first ring gear (HO1) is one of smaller than and greater than a second stationary ratio ($i_{o2}$) defined by an interaction between the second toothing (4) of the planet gears (PR) and one of the second sun gear (SO2) and the second ring gear (HO2).

3. The gear unit (1) according to claim 1, wherein the planet carrier (PS) is fixed at the housing (8) and the first sun gear (SO1) is connected to the input shaft (EW) so as to be fixed with respect to rotation relative to it, wherein the rest of the components are configured to be respectively coupled with the output shaft (AW).

4. The gear unit (9, 12) according to claim 1, wherein the first sun gear (SO1) is fixed at the housing (8) and the planet carrier (PS) is coupled with the input shaft (EW') so as to be fixed with respect to rotation relative to it, whereas the rest of the components are configured to be connected to the output shaft (AW') respectively so as to be fixed with respect to rotation relative to it.

5. The gear unit (14) according to claim 1, wherein the second sun gear (SO2) is fixed at the housing (8) and the planet carrier (PS) is connected to the input shaft (EW") so as to be fixed with respect to rotation relative to it, while the rest of the components are configured to be coupled respectively with the output shaft (AW").

6. The gear unit (18) according to claim 1, wherein a first ring gear (HO1) is fixed at the housing (8) and the planet carrier (PS) is connected to the input shaft (EW) so as to be fixed with respect to rotation relative to it, while the rest of the components are configured to be connected to the output shaft (AW) respectively.

7. The gear unit (20) according to claim 1, wherein the second ring gear (HO2) is fixed at the housing (8) and the planet carrier (PS) is coupled with the input shaft (EW) so as to be fixed with respect to rotation relative to it, whereas the rest of the components are configured to be connected in each instance to the output shaft (AW) so as to be fixed with respect to rotation relative to it.

8. A gear unit (1, 9, 12, 14, 18, 20) for a compound transmission comprising:
    a housing;
        a planetary stage (2) configured to couple an input shaft (EW, EW', EW") and an output shaft (AW, AW', AW") with one another with different transmission ratios, wherein the planetary stage (2) comprises:
        a planet carrier
            at least one sun gear (SO1, SO2);
            at least one ring gear; and
            planet gears (PR) rotatably supported at the planet carrier (PS), the planet gears (PR) having a region with at least a first toothing and a second toothing (3, 4) that are axially offset with respect to an axis of rotation of the planetary stage,
        wherein a meshing engagement with at least one of a first sun gear (SO1) and a first ring gear is produced via the first toothing (3),
        wherein the planet gears (PR) mesh at the second toothing (4) with at least one of a second sun gear (SO2) and a second ring gear (HO2), and
    wherein one component of the planetary stage (2) is connected to the input shaft (EW, EW', EW") so as to be fixed with respect to rotation relative, one component of the planetary stage is fixed at the housing (8), and the rest of the components are configured to be coupled with the output shaft (AW, AW', AW"), respectively, wherein a coupling of the rest of the components of the planetary stage and a rotationally rigid connection of the input shaft (EW, EW', EW") and output shaft (AW, AW', AW") can be produced via load shifting elements (5, 6, 7, 10, 11, 13, 15, 16, 17, 19).

9. The gear unit (1, 9, 12, 14, 18, 20) according to claim 8, wherein a first stationary ratio ($i_{o1}$) defined by an interaction between the first toothing (3) of the planet gears (PR) and at least one of the first sun gear (SO1) and a first ring gear (HO1) is one of smaller than and greater than a second stationary ratio ($i_{o2}$) defined by an interaction between the second toothing (4) of the planet gears (PR) and one of the second sun gear (SO2) and the second ring gear (HO2).

10. The gear unit (1) according to claim 8, wherein the planet carrier (PS) is fixed at the housing (8) and the first sun gear (SO1) is connected to the input shaft (EW) so as to be fixed with respect to rotation relative to it, wherein the rest of the components are configured to be respectively coupled with the output shaft (AW).

11. The gear unit (9, 12) according to claim 8, wherein the first sun gear (SO1) is fixed at the housing (8) and the planet carrier (PS) is coupled with the input shaft (EW') so as to be fixed with respect to rotation relative to it, whereas the rest of the components are configured to be connected to the output shaft (AW') respectively so as to be fixed with respect to rotation relative to it.

12. The gear unit (14) according to claim 8, wherein the second sun gear (SO2) is fixed at the housing (8) and the planet carrier (PS) is connected to the input shaft (EW") so as to be fixed with respect to rotation relative to it, while the rest of the components are configured to be coupled respectively with the output shaft (AW").

13. The gear unit (18) according to claim 8, wherein a first ring gear (HO1) is fixed at the housing (8) and the planet carrier (PS) is connected to the input shaft (EW) so as to be fixed with respect to rotation relative to it, while the rest of the components are configured to be connected to the output shaft (AW) respectively.

14. The gear unit (20) according to claim 8, wherein the second ring gear (HO2) is fixed at the housing (8) and the planet carrier (PS) is coupled with the input shaft (EW) so as to be fixed with respect to rotation relative to it, whereas the rest of the components are configured to be connected in each instance to the output shaft (AW) so as to be fixed with respect to rotation relative to it.

15. A compound transmission for a utility vehicle, comprising
  a gear unit (1, 9, 12, 14, 18, 20) for the compound transmission comprising:
  a housing;
  a planetary stage (2) configured to couple an input shaft (EW, EW', EW") and an output shaft (AW, AW', AW") with one another with different transmission ratios, wherein the planetary stage (2) comprises:
  a planet carrier
    at least one sun gear (SO1, SO2);
    at least one ring gear; and
    planet gears (PR) rotatably supported at the planet carrier (PS), the planet gears (PR) having a region with at least a first toothing and a second toothing (3, 4) that are axially offset with respect to an axis of rotation of the planetary stage,
  wherein a meshing engagement with at least one of a first sun gear (SO1) and a first ring gear is produced via the first toothing (3),
  wherein the planet gears (PR) mesh at the second toothing (4) with at least one of a second sun gear (SO2) and a second ring gear (HO2), and
  wherein one component of the planetary stage (2) is connected to the input shaft (EW, EW', EW") so as to be fixed with respect to rotation relative, one component of the planetary stage is fixed at the housing (8), and the rest of the components are configured to be coupled with the output shaft (AW, AW', AW"), respectively.

16. The compound transmission for a utility vehicle, according to claim 15, wherein utility vehicle is one of an agricultural vehicle and a municipal utility vehicle.

* * * * *